United States Patent [19]

Nishiwaki et al.

[11] Patent Number: 5,125,969
[45] Date of Patent: Jun. 30, 1992

[54] RECORDING LIQUID AND INK JET RECORDING METHOD EMPLOYING THE SAME

[75] Inventors: Osamu Nishiwaki, Atsugi; Kazuo Iwata, Yokohama; Shinichi Tochihara, Hatano; Hitoshi Sugimoto, Yokohama, all of Japan

[73] Assignee: Canon Kabushiki Kaisha, Tokyo, Japan

[21] Appl. No.: 466,602

[22] Filed: Jan. 17, 1990

[30] Foreign Application Priority Data

Jan. 27, 1989 [JP] Japan .................. 1-18009
May 11, 1989 [JP] Japan .................. 1-119602
Nov. 17, 1989 [JP] Japan .................. 1-299220

[51] Int. Cl.⁵ .......................... C09D 11/02
[52] U.S. Cl. ...................... 106/22; 534/724; 534/815
[58] Field of Search ............. 106/20, 22; 534/724, 534/573, 583, 815

[56] References Cited

U.S. PATENT DOCUMENTS

| | | | |
|---|---|---|---|
| 4,601,756 | 7/1986 | Chiba et al. | |
| 4,724,001 | 2/1988 | Ohata et al. | 106/22 |
| 4,765,838 | 8/1988 | Ohata et al. | 106/22 |
| 4,841,037 | 6/1989 | Ohata et al. | 534/815 |
| 4,908,062 | 3/1990 | Balmforth et al. | 106/22 |
| 4,923,515 | 5/1990 | Kioke et al. | 106/22 |
| 4,986,850 | 1/1991 | Iwata et al. | 106/25 |

FOREIGN PATENT DOCUMENTS

| | | |
|---|---|---|
| 3616828 | 11/1986 | Fed. Rep. of Germany . |
| 3619573 | 12/1986 | Fed. Rep. of Germany . |
| 3626567 | 2/1987 | Fed. Rep. of Germany . |
| 3438421 | 5/1989 | Fed. Rep. of Germany . |

61-285275 12/1986 Japan .

*Primary Examiner*—Mark L. Bell
*Assistant Examiner*—Helene Klemanski
*Attorney, Agent, or Firm*—Fitzpatrick, Cella, Harper & Scinto

[57] ABSTRACT

A recording liquid containing a dye, glycerine, an aliphatic monohydric alcohol and water. The dye is a mixture of C.I. Food Black 2 and at least one compound selected from compounds which are represented by the following general formulas [I] and [II]:

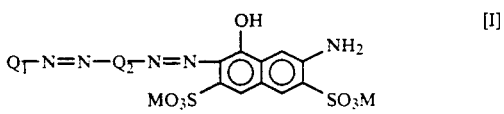

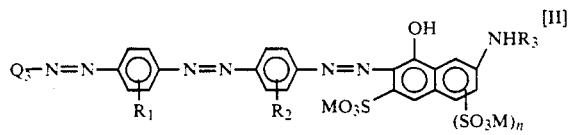

where Q1 is a phenyl group or a naphthyl group which are substituted by a lower alkyl carbonylamino group and a lower alkoxy group or a naphthyl group substituted by a $SO_3M$ group, Q2 is a naphthyl group substituted by a $SO_3M$ group or a phenyl group substituted by a lower alkoxy group, Q3 is a phenyl group, a naphthyl group, or a phenyl group or a naphthyl group which are substituted by a $SO_3M$ group, $R_1$ and $R_2$ are each a lower alkyl group, a lower alkoxy group or a lower alkyl carbonylamino group, $R_3$ is a hydrogen or a phenyl group substituted by a $SO_3M$ group, n is 0 or 1, and M is an alkaline metal or an ammonium cation.

17 Claims, No Drawings

RECORDING LIQUID AND INK JET RECORDING METHOD EMPLOYING THE SAME

BACKGROUND OF THE INVENTION

1. Field of the Invention

The present invention relates to a novel recording liquid which provides high density images having excellent waterfastness and high quality for recording on sheets of paper normally used in offices or schools. The present invention also relates to an ink jet recording method of the type in which such a recording liquid is ejected for recording by the action of thermal energy.

2. Description of the Related Art

Various types of compositions have been proposed as inks for use in recording images on a material, such as a sheet of paper. Such inks may be used in conjunction with writing implements, stamps, recorders or ink jet recording devices. Typical inks are composed of various types of dyes and water or other organic solvents in which the dyes are dissolved or dispersed.

Various types of ink jet recording methods are known. Typical examples include: an ink jet recording method in which a portion of the charged droplets which are generated in sequence are used for recording; an ink jet recording method in which a signal is supplied to a recording head incorporating a piezoelectric element so that a droplet of a recording liquid can be generated in response to the signal supplied for recording; and an ink jet recording method in which thermal energy is applied to a recording liquid contained in a chamber of a recording head in accordance with a recording signal so as to generate a droplet. Owing to their peculiarity, such ink jet recording methods require a recording liquid which satisfies stricter conditions as compared with those recording liquids used in conjunction with the writing implements, stamps or recorders.

Those conditions include:

(1) A recording liquid which allows vivid images having a contrast to be recorded at a high density.

(2) A recording liquid which allows high-quality images to be recorded on any type of recording medium without irregular blurring.

(3) A recording liquid which can be fixed to a recording medium quickly (e.g., can be dried quickly on a recording medium) and firmly, and cannot therefore be scrubbed off.

(4) A recording liquid which ensures that the printed images exhibit excellent waterfastness and lightfastness.

(5) A recording liquid which can be ejected from a fine orifice stably in the form of droplets without clogging the orifice.

(6) Even when kept uncapped while the recording is being suspended, a recording liquid is provided which can be ejected stably immediately after recording has been restarted. In other words, ink located near the orifice is not readily dried, thus preventing clogging.

(7) A recording liquid which can be stored stably for a long period of time without deterioration in the ink performance.

(8) A recording liquid which does not corrode the member with which it is in contact.

(9) A recording liquid which is safe, non-toxic and not flammable.

In order to fulfill all the conditions described above, various ink jet components have been proposed. However, none of them fulfills all the above conditions. Recording liquids which contain a certain type of disazo dye, a certain type of trisazo dye or a combination of these dyes have been proposed in the specifications of, for example, U.S. Pat. Nos. 4,724,001, 4,765,838 and Japanese Patent Laid-Open No. 285275/1986. These recording liquids exhibit excellent thermal stability and excellent waterfastness, can be stored stably for a long time without degradation in the quality, and are capable of preventing clogging as compared to a recording liquid which contains a conventionally employed dye.

U.S. Pat. No. 4,601,756 discloses an improved black color ink which contains both C.I. Food Black 2 and dyes having other color tones.

Although the above-described recording liquids exhibit the aforementioned various characteristics, they do not provide images having both excellent waterfastness and high density.

SUMMARY OF THE INVENTION

An object of the present invention is to provide a recording liquid which enables vivid images to be recorded on various types of sheets of paper at high density and quality without generating irregular blurs, which exhibits excellent fixing characteristics and waterfastness. It is another object to provide a recording liquid which does not cause clogging and which can be stored stably for a long period of time without deterioration in the quality. It is an additional object to provide a recording liquid which is thermally stable and safe, as well as an ink jet recording method which employs such a recording liquid.

In order to achieve the aforementioned objects, the present invention provides a recording liquid comprising a dye and a compatible liquid carrier medium therefor, such as glycerine, an aliphatic monohydric alcohol and water. The dye is a mixture of C.I. Food Black 2 and at least one compound selected from compounds which are represented by the following general formulas [I] and [II]:

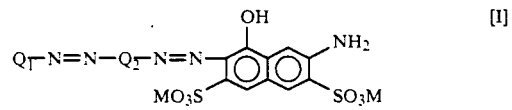

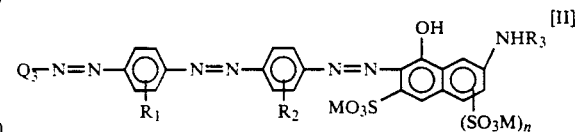

where $Q_1$ is a phenyl group or a naphthyl group which are substituted by a group selected from a lower alkyl carbonylamino group and a lower alkoxy group or a naphthyl group substituted by a $SO_3M$ group, $Q_2$ is a naphthyl group substituted by a $SO_3M$ group or a phenyl group substituted by a lower alkoxy group, $Q_3$ is a phenyl group, a naphthyl group, or a phenyl group or a naphthyl group which are substituted by a $SO_3M$ group, $R_1$ and $R_2$ are each a lower alkyl group, a lower alkoxy group and a lower alkyl carbonylamino group, $R_3$ is hydrogen or a phenyl group substituted by a $SO_3M$ group, n is 0 or 1, and M is an alkaline metal or an ammonium cation.

The present invention also provides a recording liquid which contains a dye, a urea compound selected from urea or thiourea and a liquid carrier medium, including, preferably, glycerine, an aliphatic monohydric alcohol and water. The dye is a mixture of C.I. Food Black 2 and at least one compound selected from compounds which are represented by the following general formulas [I] and [II]:

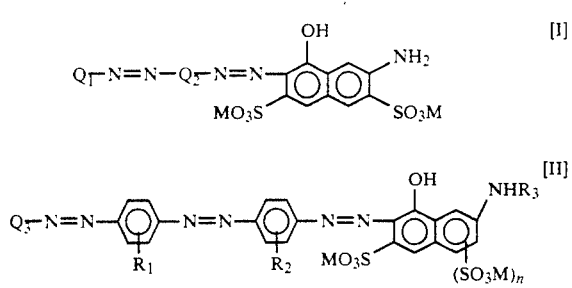

wherein Q1, Q2, Q3, $R_1$, $R_2$, $R_3$, n, and M are as above.

The present invention also provides a recording liquid comprising a dye, urea, and a liquid carrier medium such as glycerine, thiodiglycol, isopropyl alcohol, and water. The dye is a mixture of C.I. Food Black 2 and at least one compound selected from compounds which are represented by the following general formulas [I] and [II]:

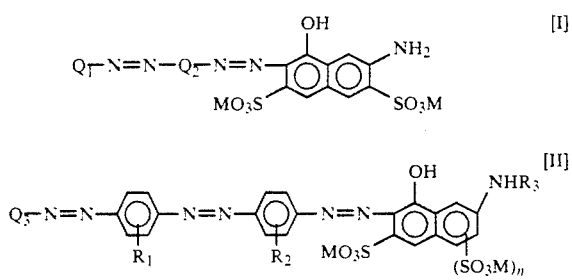

wherein Q1, Q2, Q3, $R_1$, $R_2$, $R_3$, n, and M are as above.

The present invention further provides an ink jet recording method in which an recording ink is ejected for recording from a fine orifice toward a recording material in the form of a droplet utilizing a thermal energy. The recording ink contains a dye and a compatible liquid carrier medium. The liquid carrier medium is preferably glycerine, an aliphatic monohydric alcohol and water. The dye is a mixture of C.I. Food Black 2 and at least one compound selected from compounds which are represented by the following general formulas [I] and [II]:

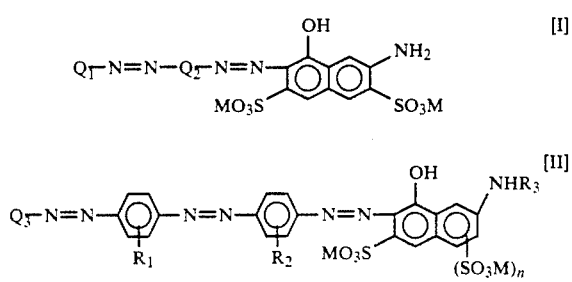

wherein Q1, Q2, Q3, $R_1$, $R_2$, $R_3$, n, and M are as above.

DETAILED DESCRIPTION OF THE PREFERRED EMBODIMENTS

C.I. Food Black 2 and the dyes represented by the general formulas [I] and [II] are water-soluble black dyes, which are thermally stable and therefore assure a stable ejection of an ink in a recording method according to the present invention which utilizes thermal energy. Preferably, these dyes are used in a refined or purified form. C.I. Food Black 2 has a low molecular weight and exhibits a low degree of dispersion of the light that it absorbs. In consequence, it permits vivid images to be recorded at a high density. However, C.I. Food Black 2 exhibits a degraded waterfastness The dye represented by the general formula [II] is characterized by its high molecular weight and a high degree of dispersion of the light that it absorbs. In consequence, images recorded using the ink containing this dye lack vividness, and have a low density. However, the dye represented by the general formula [II] has a higher substantivity and therefore exhibits excellent waterfastness. The dye represented by the general formula [I] exhibits a performance which is between that of C.I. Food Black 2 and that of the dye represented by the general formula [II]. Thus, a combination of the above-described three types of dye allows vivid images exhibiting waterfastness to be recorded at high density and contrast.

With a color tone of a resultant ink taken into consideration, the most desirable combination may be the use of all of the three types of dye.

C.I. Food Black 2 employed in the present invention includes that having the following structural formula [III]:

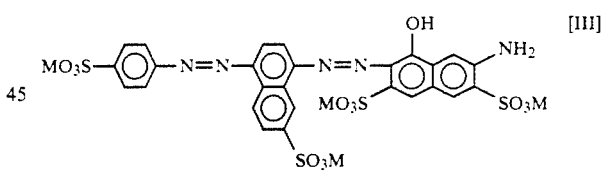

where M is an alkaline metal, such as Na, K or Li, or an ammonium cation.

The lower alkyl carbonylamino group incorporated in the structure of the dyes represented by the general formulas [I] and [II] may be an alkyl carbonylamino group whose total number of carbon atoms ranges from 1 to 4. The lower alkoxy group may be an alkoxy group whose total number of carbon atoms ranges from 1 to 4, e.g., a methoxy group and an ethoxy group. The lower alkyl group may be an alkyl group whose total number of carbon atoms ranges from 1 to 4, e.g., a methyl group and a ethyl group.

M represents an alkaline metal such as Na, K, or Li, or an ammonium cation such as $NH_4\oplus$, $NH(C_2H_4OH)_3\oplus$ or $NH(CH_3)_3\oplus$.

Examples of the dye represented by the general formula [I] are as follows:

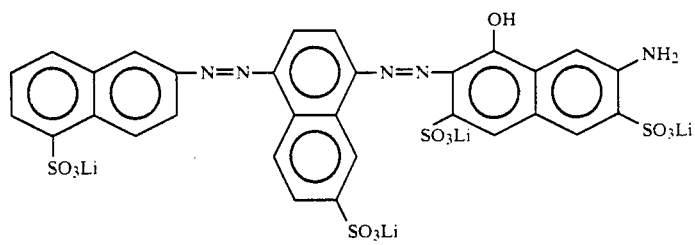
No. 1
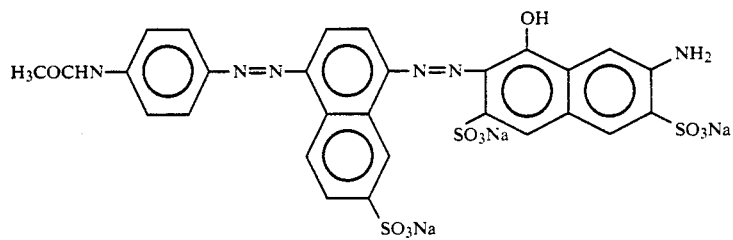
No. 2
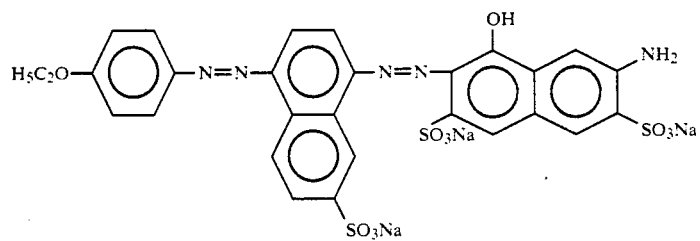
No. 3
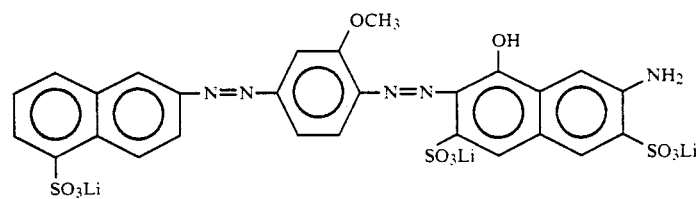
No. 4
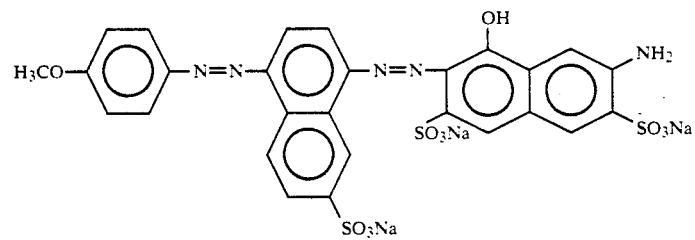
No. 5
Next, examples of the dye represented by the general formula [II] are as follows:
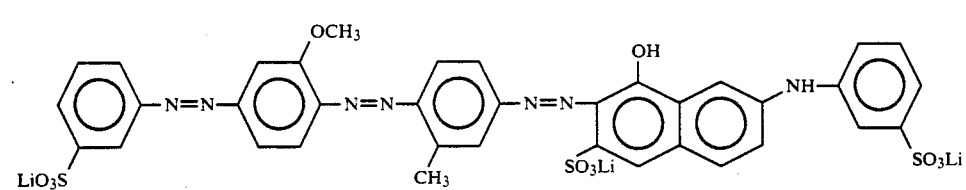
No. 6
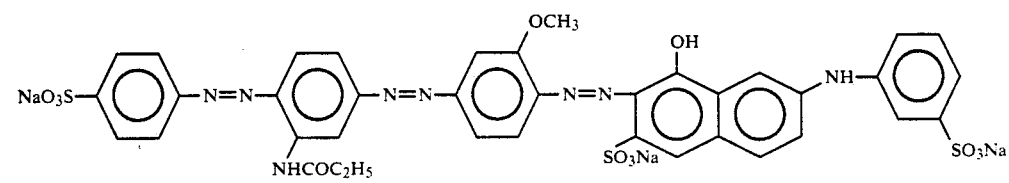
No. 7

-continued

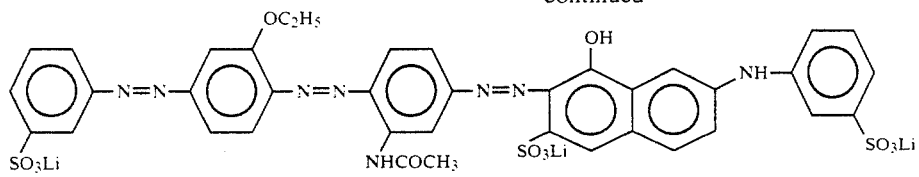

No. 8

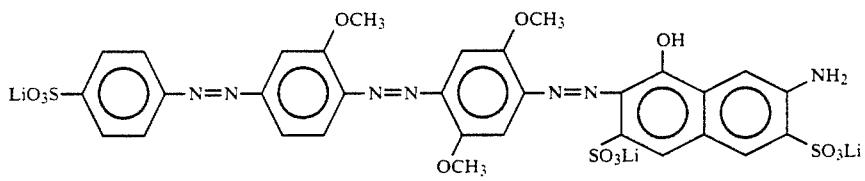

No. 9

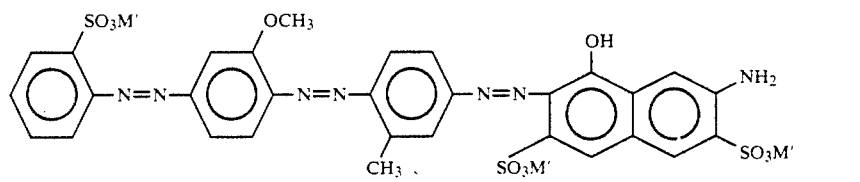

No. 10

(M': NH(C$_2$H$_4$OH)$_3$)

The most desirable form of a dye employed in the present invention may be a mixture which contains C.I. Food Black 2, a compound of formula [I] indicated by No. 1, and a compound of formula [II] indicated by No. 6.

It was found desirable to mix C.I. Food Black 2 and the dye represented by the general formulas [I] and/or [II] in a ratio (weight ratio) from 8 : 2 to 2 : 8, more preferably, in a ratio ranging from 3 : 1 to 1 : 3. In the case where both the dye represented by the general formula [I] and the dye represented by the general formula [II] are employed, they are preferably mixed in a weight ratio ranging from 2 : 1 to 1 : 2.

The preferred amount of dye contained in the recording liquid is from 0.1 wt % to 15 wt %, and more preferably, from wt % to 5 wt %. Unless otherwise indicated, all weights are based on the total weight of the recording liquid. The above-described dyes may be used together with other dyes.

Next, a dye-compatible liquid medium carrier employed in the present invention will be described in detail below.

Conventionally used liquid media carrier include solvents having a high boiling point, such as polyhydric alcohols. Such solvents having a high boiling point are capable of preventing clogging. However, they have a low surface tension, and this allows droplets of the resultant recording liquid to be spread irregularly over a sheet of paper, thereby degrading the quality of an image. Hence, when the solvents having a high boiling point such as polyhydric alcohols are used, it is difficult to simultaneously prevent clogging and to provide an image having a high quality. Glycerine, which is employed in the present invention, has a high surface tension, although it has a high boiling point. This results in an image having a high quality. Furthermore, glycerine is highly hygroscopic, so a small amount of glycerine is enough to prevent clogging. Glycerine may be contained in the recording liquid in an amount ranging from 1 wt% to 30 wt %, and preferably, ranging from 3 wt % to 15 wt %.

In addition to glycerine, other solvents, e.g., thiodiglycol, may be added to the recording liquid according to the present invention. Such solvents may be added in an amount which does not adversely affect the prevention of clogging and production of an image having a high density.

Thiodiglycol is effective in improving the coloring density of a dye, and allows the resultant ink to be ejected from an orifice smoothly after recording has been suspended for a time.

In the present invention, a urea compound, such as urea or thiourea, may be used together with glycerine for further improving prevention of clogging and for further increasing the concentration of the dyes in the recording liquid.

It is known that the addition of urea or thiourea in an ink is effective to prevent clogging. The present inventors discovered that, when urea or thiourea are together with glycerine, no clogging of the ink occurred even when the ink contained a larger amount of dye. Further, he viscosity of the resultant recording liquid remained low and the ink maintained fluidity when the water in the recording liquid was evaporated and the recording liquid contained only glycerine, the dyes, and the above-described compounds. Hence, the use of urea or thiourea permits the amount of polyhydric alcohol to be decreased relative to the amount of dyes added, thus allowing the quality and the fixing characteristics of recorded image to be further improved.

Glycerine employed in the present invention has a high boiling point, and is highly viscous. Glycerine does not effectively dissolve the dye employed in the present invention, thereby limiting the amount of dye to be employed. It is therefore necessary for the amount of glycerine to be increased in order to achieve sufficient image density and clogging prevention effects. However, the use of a large amount of glycerine increases the viscosity of the ink and degrades the ejection stability, which leads to problems in ejection of the ink.

Further, the use of a very large amount of glycerine degrades the quality of an image recorded. For the aforementioned reasons, the addition of urea or thiourea is important for maintaining the quality of an image, for preventing clogging, for providing high image density and for ejection stability. The use of urea or thiourea is particularly effective when urea or thiourea is added to a recording liquid according to the present invention which contains the dye and the liquid carrier medium, such as glycerine, water and a monohydric alcohol.

In the present invention, urea or thiourea may be contained in a recording liquid in an amount ranging from 0.5 wt % to 20 wt %, and preferably, in an amount ranging from 1 wt % to 10 wt %.

The aliphatic monohydric alcohol is added to a recording liquid which contains, for example, the dye, glycerine and water for the purpose of improving the fixing characteristics (the drying ability of an image). Conventionally, it has been proposed to use a penetrant such as a surface-active agent. However, even though the use of a penetrant improves the fixing characteristics, it allows the resultant ink to be spread over a sheet of paper, thus generating irregular blurs and thereby degrading the quality of an image. An aliphatic monohydric alcohol, which is employed in the present invention, allows the resultant ink to be spread uniformly, and accelerates the ability of the resultant ink to pass droplets through the sheet of paper and to be evaporated. Consequently, the use of an aliphatic monohydric alcohol improves the fixing characteristics of the ink without the quality of an image being degraded.

Suitable aliphatic monohydric alcohols include ethyl alcohol, isopropyl alcohol, and n-butyl alcohol.

Isopropyl alcohol may be the most desirable one because it has no offensive odor, and is capable of improving the fixing characteristics without degrading the quality of an image to be recorded.

An aliphatic monohydric alcohol may be contained in a recording ink in an amount ranging from 0.1 wt % to 10 wt %, and preferably, in an amount ranging from 1 wt % to 5 wt %.

Water may be contained in a recording liquid in an amount ranging from 60 wt % to 90 wt %, and preferably, in an amount ranging from 70 wt % to 90 wt %.

In addition to the ingredients described above, a viscosity adjusting agent, a surface tension adjusting agent, a pH adjusting agent, a mildewproofing agent, and an anti-corrosive may also be added to the recording liquid according to the present invention.

When ink jet recording is performed on various types of sheets of paper using the recording ink according to the present invention, such problems as reduction in the quality of an image, reduction in the density of an image and deterioration of the fixing characteristics, which may be caused owing to the type of the paper employed, can be eliminated and excellent recording is therefore possible.

Examples and comparison examples with the present invention will be described below. Hereinafter, all parts by weight are referred to merely as parts.

EXAMPLE 1

| | |
|---|---|
| C.I. Food Black (M = Na) | 1.70 parts |
| The dye of example No. 1 | 0.48 parts |
| The dye of example No. 6 | 0.32 parts |
| Glycerine | 10.00 parts |
| Ethyl alcohol | 2.00 parts |
| Ion-exchanged water | 85.50 parts |

After being stirred thoroughly, the above-described composition was filtered under pressure using a Fluoropore Filter having a pore size of 0.22 μm (Fluoropore is a trademark for a filter manufactured by Sumitomo Denki Kogyo Kabushiki Gaisha) so as to obtain a recording liquid according to the present invention.

Printing was performed using this recording liquid and a recording apparatus incorporating an on-demand type multi-head (orifice size: 50×40 μm; driving voltage: 30 V; and frequency: 4 KHz) in which thermal energy was applied to an ink contained in the recording head so as to generate a droplet. Evaluations on the printing performance, the ejection performance and the storage stability of the resulting printing are shown in Table 3, which will be described later. The following items were evaluated by the following methods under the following conditions.

(1) Printing density

Printing was conducted on continuous payment slips which were available on the market using all the nozzles so as to prepare a patch. After this patch was air dried inside the room for 24 hours, the optical density thereof was measured. The following standards were used to evaluate the results of measurements:

⊚: an optical density of 1.31 or more
○: an optical density between 1.26 and 1.30
Δ: an optical density between 1.10 and 1.25
X : an optical density of 1.09 or less (2) Rate of occurrence of blur 300 dots were printed in sequence on the continuous payment slips at intervals which ensured that the adjacent dots were not in contact with each other. After this printed matter was air-dried inside a room for 24 hours, the number of irregularly blurred dots was counted using a microscope. The obtained percentage was evaluated using the following standards.

○: 15% or less
Δ: between 16% and 40%
X : 41% or more (3) Fixing characteristics (drying ability)

Alphanumeric characters were printed on the continuous payment slips. The printed alphanumeric characters were rubbed 10, 20, 30, 40, 50 and 60 seconds after the printing, respectively, using a sheet of lens cleaning paper, and the time in seconds that it took for the smear to be completely removed was measured. The following standards were used to evaluate the results of measurements.

⊚: within 10 seconds
○: between 11 seconds and 20 seconds
Δ: between 21 seconds and 40 seconds
X : 41 seconds or longer (4) Waterfastness The patch used in evaluation of Item (1) was greatly immersed in city water contained in a schale for 5 minutes. Thereafter, the patch was taken out of the water and dried. The optical density of the patch was measured in the same manner as that of Item (1), and an optical density residual rate (the optical density of the patch which was immersed/the optical density of the patch which was not yet immersed ×100 : percentage) was calculated. The results were evaluated using the following standards.

○: an optical density residual rate of 80% or more
Δ: an optical density residual rate between 60% and 79%
X : an optical density residual rate of 59% or less (5) Ejection stability Printing was conducted on 100 continuous payment slips. The discharge condition was evaluated using the following standards.

○: no anomaly

X : non-ejection or printing disorder (6) Anti-clogging characteristics (fixing restoring characteristics)

The recording liquid was stored in a constant-temperature tank at 60° C. for one month. Thereafter, it was left at a room temperature for 24 hours. After a restoration operation (suction by pumping) was conducted on the recording liquid, printing was performed using that recording liquid. The printing state was evaluated using the following standards.

○: normal printing state was restored after the restoration operation was conducted 5 times or less Δ: normal printing state was restored after the restoration operation was performed between 6 times and 10 times X : discharge problems or printing disorder occurred after the restoration operation was performed between 6 times and 10 times (7) Storage stability 100 cc of recording liquid was poured into a bottle made of a heat-resistant glass. This bottle was sealed and the sealed bottle was stored in a constant-temperature tank which was kept at 60° C. for 3 months. Thereafter, printing was conducted on 100 continuous payment slips using this recording liquid and the above-described recording apparatus. The evaluation standards are as follows.

○: no anomaly

X : ejection problems, printing disorder or discoloration

EXAMPLES 2 TO 6

Recording liquids having the compositions shown in Table 1 were manufactured in the same manner as that of Example 1. The values in parenthesis ( ) are in parts by weight.

Printing performance, discharge performance and storage stability of these recording liquids were evaluated in the same manner as that of Example 1. Table 3 shows the results of the evaluations.

TABLE 1

| Example | Dye | Liquid Medium |
|---|---|---|
| 2 | C.I. Food Black 2 (M = Li) (1.8) The dye of Example No. 1 (0.5) The dye of Example No. 6 (0.3) | Glycerine (10.0) Ethyl alcohol (2.0) Ion-exchanged water (85.4) |
| 3 | C.I. Food Black 2 (M = Na) (1.8) The dye of Example No. 1 (1.0) The dye of Example No. 6 (0.2) | Glycerine (10.0) Ethyl alcohol (3.0) Ion-exchanged water (84.0) |
| 4 | C.I. Food Black 2 (M = Li) (1.7) The dye of Example No. 1 (0.5) The dye of Example No. 6 (0.3) | Glycerine (10.0) Ethyl alcohol (2.0) Ion-exchanged water (85.5) |
| 5 | C.I. Food Black 2 (M = Li) (1.2) The dye of Example No. 8 (1.3) | Glycerine (12.0) Isopropyl alcohol (3.0) Ion-exchanged water (82.0) |
| 6 | C.I. Food Black 2 (M = Na) (1.5) The dye of Example No. 3 (1.0) | Glycerine (13.0) n-butyl alcohol (3.0) Ion-exchanged water (81.5) |

COMPARISON EXAMPLES 1 TO 6

The recording liquids having the compositions shown in Table 2 were prepared in the same manner as that of Example 1.

Printing performance, discharge performance and storage stability of these recording liquids were evaluated in the same manner as that of Example 1. Table 3 shows the results of the evaluations.

TABLE 2

| Comparison Example | Dye | Liquid Medium |
|---|---|---|
| 1 | C.I. Food Black 2 (2.5) | Glycerine (10.0) Ethyl alcohol (2.0) Ion-exchanged water (85.5) |
| 2 | The dye of Example No. 1 (2.5) | Glycerine (10.0) Ethyl alcohol (2.0) Ion-exchanged water (85.5) |
| 3 | The dye of Example No. 6 (2.5) | Glycerine (10.0) Ethyl alcohol (2.0) Ion-exchanged water (85.5) |
| 4 | C.I. Food Black 2 (M = Na) (2.5) C.I. Acid Blue 9 (0.3) C.I. Acid Yellow 23 (0.2) | Glycerine (12.0) Ethyl alcohol (4.0) Ion-exchanged water (81.1) |
| 5 | C.I. Food Black 2 (M = Na) (1.5) The dye of Example No. 1 (0.5) The dye of Example No. 6 (0.4) | Triethylenglycol (17.0) Ethyl alcohol (3.0) Ion-exchanged water (77.6) |
| 6 | C.I. Food Black 2 (M = Na) (1.7) The dye of Example No. 1 (0.5) The dye of Example No. 6 (0.3) | Glycerine (13.0) Noigen P (surface-active agent) (0.4) Ion-exchanged water (84.1) |

TABLE 3

| | Evaluation Item | | | | | | |
|---|---|---|---|---|---|---|---|
| | (1) | (2) | (3) | (4) | (5) | (6) | (7) |
| Example | | | | | | | |
| 1 | ○ | ○ | ○ | ○ | ○ | ○ | ○ |
| 2 | ○ | ○ | ○ | ○ | ○ | ○ | ○ |
| 3 | ○ | ○ | ○ | ○ | ○ | ○ | ○ |
| 4 | ○ | ○ | ○ | ○ | ○ | ○ | ○ |
| 5 | Δ | ○ | ○ | ○ | ○ | ○ | ○ |
| 6 | ○ | ○ | ○ | Δ | ○ | ○ | ○ |
| Comparison Example | | | | | | | |
| 1 | ○ | ○ | ○ | X | ○ | ○ | ○ |
| 2 | Δ | ○ | ○ | Δ | ○ | ○ | ○ |
| 3 | X | ○ | ○ | ○ | ○ | ○ | ○ |
| 4 | ○ | ○ | ○ | X | ○ | ○ | ○ |
| 5 | ○ | X | Δ | ○ | ○ | ○ | ○ |
| 6 | Δ | X | ○ | ○ | ○ | ○ | ○ |

EXAMPLE 7

| C.I. Food Black 2 (M = Na) | 1.50 parts |
|---|---|
| The dye of Example No. 1 | 0.90 parts |
| The dye of Example No. 6 | 0.60 parts |
| Glycerine | 5.00 parts |
| IPA (Isopropyl alcohol) | 4.00 parts |
| Ion-exchanged water | 83.00 parts |
| Urea | 5.00 parts |

The recording liquid having the above-described composition was prepared in the same manner as that of Example 1.

Printing performance, ejection performance and storage stability of the recording liquid was evaluated in the same manner as that of Example 1. Table 6 shows the results of the evaluations.

Following 4 types of papers were used for evaluation.

| | |
|---|---|
| SK: Canon NP Dry SK | Copying paper |
| DK: Canon NP Dry DK | |
| XX: Xerox 4024 DP | |
| Cont: Continuous payment slips | |

EXAMPLES 8 TO 14

The recording liquids having the compositions shown in Table 4 were prepared in the same manner as that of Example 1.

Printing performance, ejection performance and storage stability of the recording liquids were evaluated in the same manner as that of Example 7. Table 6 shows the results of the evaluations.

TABLE 4

| Example | Dye | Liquid Medium |
|---|---|---|
| 8 | C.I. Food Black 2 (M = Li) (2.0) | Glycerine (5.0) |
| | The dye of Example No. 1 (1.2) | Thiodiglycol (5.0) |
| | The dye of Example No. 6 (0.8) | Isopropyl alcohol (4.0) |
| | | Urea (5.0) |
| | | Ion-exchanged water (77.7) |
| 9 | C.I. Food Black 2 (M = Na) (1.8) | Glycerine (5.0) |
| | The dye of Example No. 1 (0.9) | Thiourea (5.0) |
| | The dye of Example No. 6 (0.6) | Isopropyl alcohol (3.0) |
| | | Ion-exchanged water (83.0) |
| 10 | C.I. Food Black 2 (M = Li) (1.7) | Glycerine (7.0) |
| | The dye of Example No. 1 (1.2) | Thiourea (6.0) |
| | The dye of Example No. 6 (0.6) | Isopropyl alcohol (4.0) |
| | | Thiodiglycol (4.0) |
| | | Ion-exchanged water (75.5) |
| 11 | C.I. Food Black 2 (M = Li) (1.0) | Glycerine (6.0) |
| | The dye of Example No. 8 (2.0) | Thiourea (5.0) |
| | | Ethyl alcohol (5.0) |
| | | Ion-exchanged water (81.0) |
| 12 | C.I. Food Black 2 (M = Na) (1.5) | Glycerin (5.0) |
| | The dye of Example No. 3 (1.5) | Urea (5.0) |
| | | Isopropyl alcohol (4.0) |
| | | Pure water (83.0) |
| 13 | C.I. Food Black 2 (M = Li) (1.5) | Glycerine (5.0) |
| | | Urea (5.0) |
| | The dye of Example No. 1 (0.9) | Isopropyl alcohol (4.0) |
| | The dye of Example No. 6 (0.6) | Ion-exchanged water (83.0) |
| 14 | C.I. Food Black 2 (M = Li) (1.5) | Glycerine (4.0) |
| | | Thiourea (5.0) |
| | The dye of Example No. 1 (0.9) | n-butyl alcohol (3.0) |
| | The dye of Example No. 6 (0.6) | Ion-exchanged water (85.0) |

COMPARISON EXAMPLES 7 TO 12

The recording liquids having the compositions shown in Table 5 were prepared in the same manner as that of Example 7.

Printing performance, ejection performance and storage stability of the recording liquids were evaluated in the same manner as that of Example 7. Table 6 shows the results of the evaluations.

TABLE 5

| Example | Dye | Liquid Medium |
|---|---|---|
| 7 | C.I. Food Black 2 (M = Na) (3.0) | Glycerine (5.0) |
| | | Ion-exchanged water (83.0) |
| | | Isopropyl alcohol (4.0) |
| | | Urea (5.0) |
| 8 | The dye of Example No. 1 (3.0) | Glycerine (5.0) |
| | | Urea (5.0) |
| | | Isopropyl alcohol (4.0) |
| | | Ion-exchanged water (83.0) |
| 9 | The dye of Example No. 6 (3.0) | Glycerine (5.0) |
| | | Urea (5.0) |
| | | Isopropyl alcohol (4.0) |
| | | Ion-exchanged water (83.0) |
| 10 | C.I. Food Black 2 (M = Na) (3.0) | Glycerine (6.0) |
| | C.I. Acid Blue 9 (0.3) | Urea (5.0) |
| | C.I. Acid Yellow 23 (0.2) | Ethyl alcohol (4.0) |
| | | Ion-exchanged water (77.5) |
| | | Thiodiglycol (4.0) |
| 11 | C.I. Food Black 2 (M = Na) (2.0) | Thiodiglycol (5.0) |
| | The dye of Example No. 1 (1.2) | Urea (5.0) |
| | The dye of Example No. 6 (0.8) | Isopropyl alcohol (4.0) |
| | | Ion-exchanged water (77.7) |
| 12 | C.I. Food Black 2 (M = Na) (2.0) | Glycerine (5.0) |
| | The dye of Example No. 1 (1.2) | Thiodiglycol (5.0) |
| | The dye of Example No. 6 (0.8) | Noigen P (surface-active agent) (0.4) |
| | | Ion-exchanged water (86.3) |

TABLE 6

| Paper | (1) SK | (1) DK | (1) XX | (1) Cont | (2) SK | (2) DK | (2) XX | (2) Cont | (3) SK | (3) DK | (3) XX | (3) Cont | (4) Cont | (5) Cont | (6) Cont | (7) Cont |
|---|---|---|---|---|---|---|---|---|---|---|---|---|---|---|---|---|
| Example 7 | ⊚ | ⊚ | ○ | ○ | ○ | ○ | ○ | ○ | ⊚ | ⊚ | ⊚ | ⊚ | ○ | ○ | ○ | ○ |
| Example 8 | ⊚ | ⊚ | ⊚ | ⊚ | ○ | ○ | ○ | ○ | ⊚ | ⊚ | ⊚ | ⊚ | ○ | ○ | ○ | ○ |
| Example 9 | ⊚ | ⊚ | ⊚ | ⊚ | ○ | ○ | ○ | ○ | ⊚ | ⊚ | ⊚ | ○ | ○ | ○ | ○ | ○ |
| Example 10 | ⊚ | ⊚ | ⊚ | ⊚ | ○ | ○ | ○ | ○ | ⊚ | ⊚ | ⊚ | ⊚ | ○ | ○ | ○ | ○ |
| Example 11 | ○ | ○ | ○ | ○ | ○ | ○ | ○ | ○ | ⊚ | ⊚ | ⊚ | ○ | ○ | ○ | ○ | ○ |
| Example 12 | ⊚ | ⊚ | ○ | ○ | ○ | ○ | ○ | ○ | ⊚ | ⊚ | ⊚ | ⊚ | Δ | ○ | ○ | ○ |
| Example 13 | ⊚ | ⊚ | ○ | ⊚ | ○ | Δ | ○ | ○ | ⊚ | ⊚ | ⊚ | ⊚ | ○ | ○ | ○ | ○ |
| Example 14 | ⊚ | ⊚ | ⊚ | ⊚ | ○ | Δ | ○ | ○ | ⊚ | ⊚ | ⊚ | ⊚ | ○ | ○ | ○ | ○ |
| Comparison Example 7 | ⊚ | ⊚ | ○ | ⊚ | ○ | Δ | ○ | ○ | ⊚ | ⊚ | ⊚ | ⊚ | X | ○ | ○ | ○ |
| Comparison Example 8 | ○ | ○ | X | Δ | ○ | ○ | ○ | ○ | ⊚ | ⊚ | ⊚ | ⊚ | Δ | ○ | ○ | ○ |
| Comparison | X | X | X | X | ○ | ○ | ○ | ○ | ⊚ | ⊚ | ⊚ | ⊚ | ○ | ○ | ○ | ○ |

TABLE 6-continued

| | Evaluation Item | | | | | | | | | | | | | | | |
|---|---|---|---|---|---|---|---|---|---|---|---|---|---|---|---|---|
| | (1) | | | | (2) | | | | (3) | | | | (4) | (5) | (6) | (7) |
| Paper | SK | DK | XX | Cont | SK | DK | XX | Cont | SK | DK | XX | Cont | Cont | Cont | Cont | Cont |
| Example 9 | | | | | | | | | | | | | | | | |
| Comparison Example 10 | ⊙ | ⊙ | ⊙ | ⊙ | ○ | △ | ○ | ○ | ⊙ | ⊙ | ⊙ | ⊙ | X | ○ | ○ | ○ |
| Comparison Example 11 | ⊙ | ⊙ | ⊙ | ⊙ | ○ | ○ | ○ | ○ | ⊙ | ⊙ | ⊙ | ⊙ | ○ | ○ | X | X |
| Comparison Example 12 | ⊙ | ⊙ | ⊙ | ⊙ | X | X | X | X | ⊙ | ⊙ | ⊙ | ⊙ | ○ | ○ | X | X |

As will be understood from the foregoing description, the recording liquid according to the present invention has the following advantages:

(1) It allows vivid, high-quality and high-density images to be printed on various types of sheets of paper.

(2) It exhibits excellent fixing characteristics (dries quickly), and eliminates smear of printed matters caused by rubbing.

(3) The characteristics thereof do not change during a long period of storage, thus enabling stable discharge.

(4) It allows printed images to exhibit excellent waterfastness add lightfastness.

(5) It prevents a recording head from drying quickly, thereby ensuring a stable ejection when a recording is restarted after it has been suspended over a long period of time.

(6) It ensures a stable ejection and causes no problems when employed in a recording method which utilizes thermal energy.

Thus, the recording liquid according to the present invention is suitable for use in an ink jet recording method.

The present invention is not to be limited except as set forth in the following claims.

What is claimed is:

1. A recording liquid comprising: a dye, glycerine, said glycerine being present in said recording liquid in an amount between about 1 wt. % to 30 wt. % based on the total weight of said recording liquid, an aliphatic monohydric alcohol, said aliphatic monohydric alcohol being present in said recording liquid in an amount between 0.1 wt. % and 10 wt. % based on the total weight of said recording liquid and water, said dye being a mixture of C.I. Food Black 2 and at least one compound selected from compounds which are represented by the following general formulas [I] and [II]:

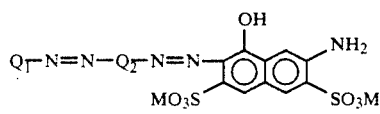

[I]

-continued

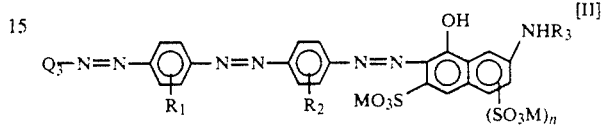

[II]

wherein Q1 is a phenyl group substituted with a lower alkylcarbonylamino group or a lower alkoxy group, a naphthyl group substituted with a lower alkylcarbonylamino group and a lower alkoxy group or a naphthyl group substituted with a $SO_3M$ group, Q2 is a naphthyl group substituted with a $SO_3M$ group or a phenyl group substituted with a lower alkoxy group, Q3 is a phenyl group, a naphthyl group, a phenyl group substituted with a $SO_3M$ group or a naphthyl group substituted with a $SO_3M$ group, $R_1$ and $R_2$ are each a lower alkyl group, a lower alkoxy group or a lower alkylcarbonylamino group, $R_3$ is a hydrogen or a phenyl group substituted with a $SO_3M$ group, n is 0 or 1, and M is an alkaline metal or an ammonium cation, wherein said Food Black 2 and said at least one compound represented by said general formula [I] and [II] are mixed in a weight ratio from 8:2 to 2:8.

2. A recording liquid according to claim 1, wherein said aliphatic monohydric alcohol is ethyl alcohol, isopropyl alcohol or n-butyl alcohol.

3. A recording liquid according to claim 1, wherein said compound represented by the general formula [I] has the following formula:

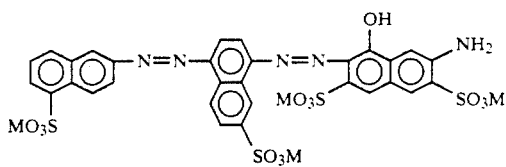

4. A recording liquid according to claim 1, wherein said compound represented by the general formula [II] has the following formula:

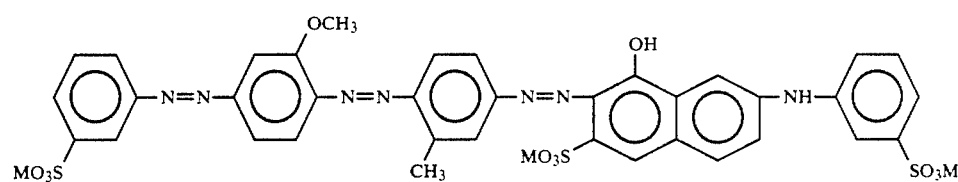

wherein M is an alkaline metal or an ammonium cation.

5. A recording liquid comprising a dye, glycerine, said glycerine being present in said recording liquid in an amount between about 1 wt. % to 30 wt. % based on the total weight of said recording liquid, a urea compound selected from the group consisting of urea or thiourea, said urea compound being present in said recording liquid in an amount between 0.5 wt. % and 20 wt. % based on the total weight of said recording liquid, an aliphatic monohydric alcohol, said aliphatic monohydric alcohol being present in said recording liquid in an amount between 0.1 wt. % and 10 wt. % based on the total weight of said recording liquid and water, said dye being a mixture of C.I. Food Black 2 and at least one compound selected from the compounds which are represented by the following general formulas [I] and [II]:

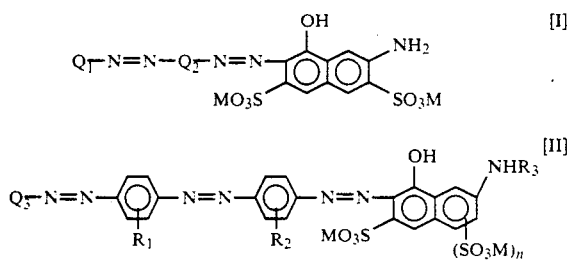

wherein Q1 is a phenyl group substituted with a lower alkylcarbonylamino group or a lower alkoxy group, a naphthyl group substituted with a lower alkylcarbonylamino group and a lower alkoxy group or a naphthyl group substituted with a $SO_3M$ group, Q2 is a naphthyl group substituted with a $SO_3M$ group or a phenyl group substituted with a lower alkoxy group, Q3 is a phenyl group, a naphthyl group, a phenyl group substituted with a $SO_3M$ group or a naphthyl group substituted with a $SO_3M$ group, $R_1$ and $R_2$ are each a lower alkyl group, a lower alkoxy group or a lower alkylcarbonylamino group, $R_3$ is a hydrogen or a phenyl group substituted with a $SO_3M$ group, n is 0 or 1, and M is an alkaline metal or an ammonium cation, wherein said Food Black 2 and said at least one compound represented by said general formulas [I] and [II] are mixed in a weight ratio from 8:2 to 2:8.

6. A recording liquid according to claim 5, wherein said aliphatic monohydric alcohol is ethyl alcohol, isopropyl alcohol or n-butyl alcohol.

7. A recording liquid according to claim 5, wherein said compound represented by the general formula [I] has the following formula:

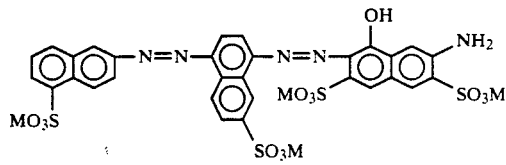

wherein M is an alkaline metal or an ammonium cation.

8. A recording liquid according to claim 5, wherein said compound represented by the general formula [II] has the following formula:

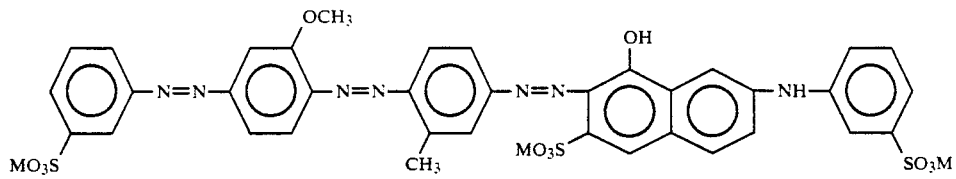

wherein M is an alkaline metal or an ammonium cation.

9. A recording liquid comprising a dye, glycerine, said glycerine being present in said recording liquid in an amount between about 1 wt. % to 30 wt. % based on the total weight of said recording liquid, thiodiglycol, said thiodiglycol being present in said recording liquid in an amount between 1 wt. % and 30 wt. % based on the total weight of the recording liquid, urea, said urea being present in said recording liquid in an amount between 0.5 wt. % and 20 wt. % based on the total weight of the recording liquid, isopropyl alcohol, said isopropyl alcohol being present in said recording liquid in an amount between 0.1 wt. % and 10 wt. % based on the total weight of the recording liquid and water, said dye being a mixture of C.I. Food Black 2 and at least one compound selected from compounds which are represented by the following general formulas [I] and [II]:

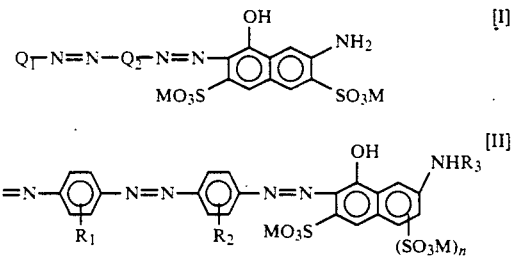

wherein Q1 is a phenyl group substituted with a lower alkylcarbonylamino group or a lower alkoxy group, a naphthyl group substituted with a lower alkylcarbonylamino group and a lower alkoxy group or a naphthyl group substituted with a $SO_3M$ group, Q2 is a naphthyl group substituted with a $SO_3M$ group or a phenyl group substituted with a lower alkoxy group, Q3 is a phenyl group, a naphthyl group, a phenyl group substituted with a $SO_3M$ group or a naphthyl group substituted with a $SO_3M$ group, $R_1$ and $R_2$ are each a lower alkyl group, a lower alkoxy group or a lower alkylcarbonylamino group, $R_3$ is a hydrogen or a phenyl group substituted with a $SO_3M$ group, n is 0 or 1, and M is an alkaline metal or an ammonium cation, wherein said Food Black 2 and said at least one compound represented by said general formulas [I] and [II] are mixed in a weight ratio from 8:2 to 2:8.

10. A recording liquid according to claim 9, wherein said compound represented by the general formula [I] has the following formula:

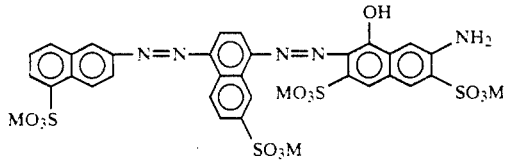

wherein M is an alkaline metal or an ammonium cation.

11. A recording liquid according to claim 9, wherein said compound represented by the general formula [II] has the following formula:

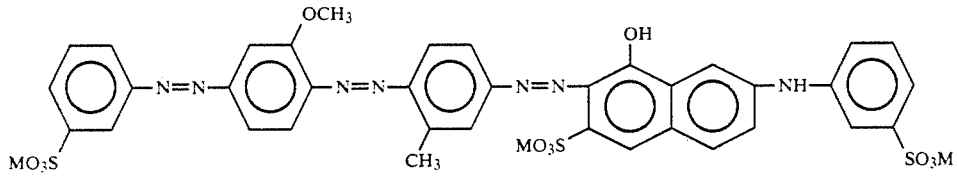

wherein M is an alkaline metal or an ammonium cation.

12. In an ink jet recording method in which a recording ink is ejected for recording from a fine orifice toward a recording material in the form of a droplet utilizing a thermal energy, the improvement comprising employing as the recording ink a composition comprising a dye, glycerine, said glycerine being present in said recording liquid in an amount between 1 wt. % to 30 wt. % based on the total weight of the recording liquid, an aliphatic monohydric alcohol, said aliphatic monohydric alcohol being present in said recording liquid in an amount between 0.1 wt. % and 10 wt. % based on the total weight of the recording liquid and water, said dye being a mixture of C.I. Food Black 2 and at least one compound selected from compounds which are represented by the following general formulas [I] and [II]:

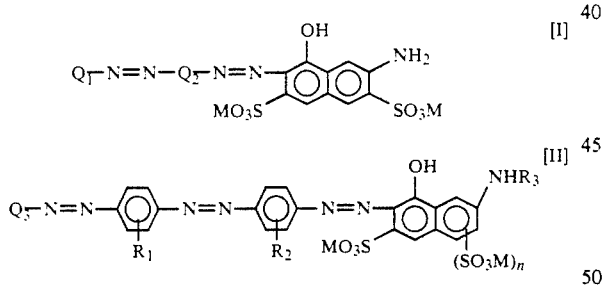

wherein Q1 is a phenyl group substituted with a lower alkylcarbonylamino group or a lower alkoxy group, a naphthyl group substituted with a lower alkylcarbonylamino group and a lower alkoxy group or a naphthyl group substituted with a $SO_3M$ group, Q2 is a naphthyl group substituted with a $SO_3M$ group or a phenyl group substituted with a lower alkoxy group, Q3 is a phenyl group, a naphthyl group, a phenyl group substituted with a $SO_3M$ group or a naphthyl group substituted with a $SO_3M$ group, $R_1$ and $R_2$ are each a lower alkyl group, a lower alkoxy group or a lower alkylcarbonylamino group, $R_3$ is a hydrogen or a phenyl group substituted with a $SO_3M$ group, n is 0 or 1, and M is an alkaline metal or an ammonium cation, wherein said Food Black 2 and said at least one compound represented by said general formulas [I] and [II] are mixd in a weight ratio from 8:2 to 2:8.

13. In an ink jet recording method according to claim 12, wherein said recording liquid includes a urea compound selected from the group consisting of urea or thiourea.

14. In an ink jet recording method according to claim 12, wherein said recording liquid includes thiodiglycol.

15. In an ink jet recording method according to claim 12, wherein said aliphatic monohydric alcohol is ethyl alcohol, isopropyl alcohol or n-butyl alcohol.

16. In an ink jet recording method according to claim 12, wherein said compound represented by the general formula [I] has the following formula:

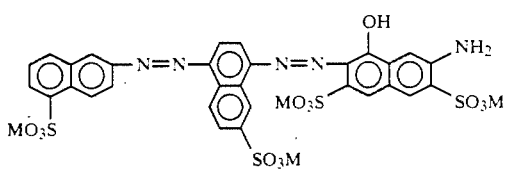

wherein M is an alkaline metal or an ammonium cation.

17. In an ink jet recording method according to claim 12, wherein said compound represented by the general formula [II] has the following formula:

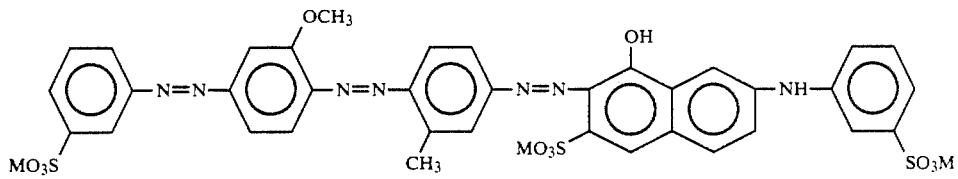

wherein M is an alkaline metal or an ammonium cation.

* * * * *

UNITED STATES PATENT AND TRADEMARK OFFICE
CERTIFICATE OF CORRECTION

PATENT NO. : 5,125,969
DATED : June 30, 1992
INVENTOR(S) : OSAMU NISHIWAKI, ET AL.

It is certified that error appears in the above-identified patent and that said Letters Patent is hereby corrected as shown below:

COLUMN 3

Line 44, "an" should read --a--.

COLUMN 4

Line 62, "a" should read --an--.

COLUMN 8

Line 43, "he" should read --the--.

COLUMN 9

EXAMPLE 1, "C.I. Food Black (M = Na)" should read --C.I. Food Black 2 (M = Na)--.

COLUMN 13

TABLE 4, "Glycerin (5.0)" should read --Glycerine (5.0)--.

COLUMN 14

TABLE 5, "Example" should read --Comparison Example --.

COLUMN 15

Line 24, "add" should read --and--.

UNITED STATES PATENT AND TRADEMARK OFFICE
CERTIFICATE OF CORRECTION

PATENT NO. : 5,125,969
DATED : June 30, 1992
INVENTOR(S) : OSAMU NISHIWAKI, ET AL.

Page 2 of 2

It is certified that error appears in the above-identified patent and that said Letters Patent is hereby corrected as shown below:

<u>COLUMN 16</u>

Line 35, "formula [I]" should read --formulas [I]--.

<u>COLUMN 20</u>

Line 25, "mixd" should read --mixed--.

Signed and Sealed this

Seventh Day of September, 1993

Attest:

BRUCE LEHMAN

*Attesting Officer*    *Commissioner of Patents and Trademarks*